(12) United States Patent
Lee

(10) Patent No.: US 6,709,101 B1
(45) Date of Patent: Mar. 23, 2004

(54) APPARATUS AND METHOD FOR AVOIDING OCULAR MUSCULAR FATIGUE

(75) Inventor: Henri Kwok-Wai Lee, Box Hill (AU)

(73) Assignee: Positive Plan PTY LTD, East Doncaster (AU)

( * ) Notice: Subject to any disclaimer, the term of this patent is extended or adjusted under 35 U.S.C. 154(b) by 0 days.

(21) Appl. No.: 09/787,710

(22) PCT Filed: Sep. 27, 1999

(86) PCT No.: PCT/AU99/00826

§ 371 (c)(1),
(2), (4) Date: May 30, 2001

(87) PCT Pub. No.: WO00/19263

PCT Pub. Date: Apr. 6, 2000

(30) Foreign Application Priority Data

Sep. 28, 1998 (AU) .............................................. PP 6180

(51) Int. Cl.⁷ ................................................. G02C 7/02
(52) U.S. Cl. ........................ 351/159; 351/175; 351/177
(58) Field of Search ................................ 351/158–159, 351/41, 59, 128, 174–175, 177, 204, 44, 165; 359/837, 407, 409–412

(56) References Cited

U.S. PATENT DOCUMENTS

| | | | |
|---|---|---|---|
| 3,245,745 A | 4/1966 | Hancock | 351/167 |
| 4,542,964 A | 9/1985 | Gilson et al. | 351/44 |
| 4,637,696 A | 1/1987 | Wilkins | 351/41 |
| 4,717,239 A | 1/1988 | Steenblik | 359/418 |
| 4,820,035 A * | 4/1989 | Kanda | 351/153 |
| 4,886,340 A * | 12/1989 | Kanda | 359/411 |
| 4,892,384 A | 1/1990 | Okamoto | 359/420 |
| 4,893,898 A * | 1/1990 | Beard | 359/464 |
| 4,911,546 A * | 3/1990 | Cohen | 351/44 |
| 4,961,639 A | 10/1990 | Lazarus | 351/41 |
| 5,054,901 A | 10/1991 | Kaye | 351/44 |
| 5,076,665 A | 12/1991 | Petersen | 359/809 |
| 5,204,702 A | 4/1993 | Shapiro | 351/175 |
| 5,381,191 A | 1/1995 | Levy | 351/57 |

FOREIGN PATENT DOCUMENTS

| | | | |
|---|---|---|---|
| EP | 0 362 692 | | 4/1990 |
| JP | 61-72220 | * | 4/1986 |

* cited by examiner

Primary Examiner—Jordan M. Schwartz
(74) Attorney, Agent, or Firm—Larson & Taylor PLC

(57) ABSTRACT

The present invention provides an apparatus and method for avoiding ocular muscular fatigue, the apparatus comprising a binocular light converging means (12, 14) for converging incident light (18, 20), thereby reducing ocular convergence demand when the apparatus is worn by a user. In a preferred embodiment, the binocular light converging means comprises a pair of lenses.

28 Claims, 2 Drawing Sheets

APPARATUS AND METHOD FOR AVOIDING OCULAR MUSCULAR FATIGUE

The present invention relates to an apparatus and method for the reduction or avoidance of muscular fatigue of the eyes, and is of particular but not exclusive application in avoiding such muscular fatigue encountered during prolonged reading or close use of equipment such as computers.

Existing apparatus for reducing the ill effects to the eyes of prolonged reading or use of computers, or of other activities requiring the intensive, close use of the eyes, include non-prescription spectacles with colour lenses to act as filters 1) to reduce the glare from a surrounding light source and reflection from the surface on which the eyes are focussed, and/or 2) to enhance the contrast sensitivity of the print or material being focussed upon (generally by means of a yellow filter).

Other apparatus can be used to magnify the image on a computer screen, thereby reducing the degree to which a user's eyes must focus small images. Such apparatus may employ 1) one or more Fresnel lenses, and/or 2) low plus lenses which also have magnifying effect, usually ranging from +0.50 to +0.75 spherical dioptre power.

It is an object of the present invention to provide an apparatus and method for reducing or avoiding ocular muscular fatigue in such circumstances.

According to a first broad aspect of the present invention there is provided an apparatus for avoiding ocular muscular fatigue comprising:

a binocular light converging means comprising two optical elements for converging incident light, thereby reducing ocular convergence demand when said apparatus is worn by a user, wherein each of said optical elements comprising a spherical optical wedge with a base, said bases being adjacent thereby forming base-in prisms.

The present invention also provides an apparatus for avoiding ocular muscular fatigue comprising:

a binocular light converging means comprising two optical elements for converging incident light, thereby reducing ocular convergence demand when said apparatus is worn by a user, and adjustment means for adjusting the separation of said optical elements according to pupil separation of a user.

The present invention further provides an apparatus for avoiding ocular muscular fatigue comprising:

a binocular light converging means comprising two optical elements for converging incident light, thereby reducing ocular convergence demand when said apparatus is worn by a user, wherein said optical elements are 0.2 to 10 base lenses.

The present invention still further provides an apparatus for avoiding ocular muscular fatigue comprising:

a binocular light converging means comprising two optical elements for converging incident light, thereby reducing ocular convergence demand when said apparatus is worn by a user, wherein said optical elements are additionally prescription lenses.

Thus, the extent to which the eyes of a user of a computer or reader of any text material must converge owing to the proximity of that computer or other text material (or other apparatus) is reduced by the apparatus according to the present invention, which performs part or much of the required convergence by means of refraction. The eyes of the user may thereby be directed generally forward and parallel, even though the user is reading material or operating a computer or other apparatus whose proximity would normally require a convergence of as much as 15° or more.

Preferably the binocular light converging means is integral.

Thus, the binocular light converging means may comprise a pair of optical elements (such as lenses) but these are preferably formed integrally.

Preferably the binocular light converging means is of polycarbonate, acrylic or some other polymeric plastic material.

Although the, for example, lenses may be made of glass, it would generally be cheaper and more convenient to construct them from a plastic material, which will also be less vulnerable to breakage.

Preferably the binocular light converging means is a magnifying binocular light converging means.

Thus, the apparatus, in addition to reducing the required ocular convergence, may also magnify the user's view.

Preferably the binocular light converging means includes or is additionally at least one colour filter, preferably for reducing the intensity of transmitted yellow light. Thus, any benefits of reducing particular colour intensities may be combined with those of the convergence according to the present invention.

Preferably the apparatus includes adjustment means whereby the separation of the optical elements can be adjusted according to pupil separation of a user. Thus, the apparatus may be adjusted so that the optical elements are positioned accurately relative to each eye of a user.

Preferably the light converging means comprises two lenses. Thus, although the light converging means are preferably lenses, any suitable alternative may be employed, including prisms.

Preferably each of said optical elements comprises an optical wedge with a base, wherein said bases of said lenses are adjacent thereby forming base-in prisms. More preferably each of the optical elements comprises a spherical optical wedge.

Thus, the lenses are preferably formed from blanks of spherical form, but thicker at one extremity relative to the other to provide the properties of an optical wedge.

Preferably the optical elements are 0.2 to 10 base lenses, more preferably 0.25 to 1.5 base lenses, and most preferably approximately 0.5 base lenses. Thus, lenses of higher base may be used but in normal use 2 or 3 base lenses may provide excessive convergence.

Thus, the convergence effect of the apparatus according to the present invention may be combined with a corrective prescription to provide prescription glasses that also provide the convergence according to the present invention.

According to a second broad aspect of the present invention there is provided a method for reducing ocular muscular fatigue due to convergence demand comprising converging light prior to said light's incidence on a user's eyes by means of a pair of optical elements each comprising a spherical optical wedge with a base, wherein said bases of said optical elements are adjacent thereby forming base-in prisms.

The invention also provides a method for reducing ocular muscular fatigue due to convergence demand comprising converging light prior to said light's incidence on a user's eyes by means of a pair of optical elements, wherein each of said optical elements comprises an optical wedge with a base, said bases of said optical elements are adjacent thereby forming base-in prisms, and said lenses are 0.2 to 10 base lenses.

The invention further provides a method for reducing ocular muscular fatigue due to convergence demand comprising converging light prior to said light's incidence on a user's eyes by means of a pair of optical elements, wherein optical elements are additionally prescription lenses.

The invention still further provides a method for reducing ocular muscular fatigue due to convergence demand comprising converging light prior to said light's incidence on a user's eyes by means of a pair of optical elements, and adjusting the separation of the optical elements according to pupil separation of a user.

According to a third broad aspect of the present invention a pair of spectacles for avoiding ocular muscular fatigue comprising a pair of convergent lenses for converging incident light, thereby reducing ocular convergence demand when said spectacles are worn by a user, each of said lenses comprising a spherical optical wedge with a base, wherein said bases of said lenses are adjacent thereby forming base-in prisms.

The present invention also provides a pair of spectacles for avoiding ocular muscular fatigue comprising a pair of convergent lenses for converging incident light, thereby reducing ocular convergence demand when said spectacles are worn by a user, wherein said lenses are 0.2 to 10 base lenses.

The present invention further provides a pair of spectacles for avoiding ocular muscular fatigue comprising a pair of convergent lenses for converging incident light, thereby reducing ocular convergence demand when said spectacles are worn by a user, wherein said spectacles are additionally prescription spectacles.

The present invention still further provides a pair of spectacles for avoiding ocular muscular fatigue comprising a pair of convergent lenses for converging incident light, thereby reducing ocular convergence demand when said spectacles are worn by a user; and adjustment means whereby the lenses' separation can be adjusted according to pupil separation of a user.

Preferably the lenses are 0.25 to 1.5 base lenses, and more preferably approximately 0.5 base lenses.

Preferably the lenses are integral with each other. Preferably the lenses are magnifying lenses.

Preferably the spectacles include, or said lenses additionally comprise, one or more colour filters, preferably for reducing the intensity of transmitted yellow light.

It should be noted that the convergence of light produced by the apparatus, method or spectacles according to the present invention will reduce the convergence demand on the user's eyes and thereby increase the divergence of the users eyes.

Preferred embodiments of the invention will be described, by way of example, with reference to the accompanying drawings in which.

Figure 1:
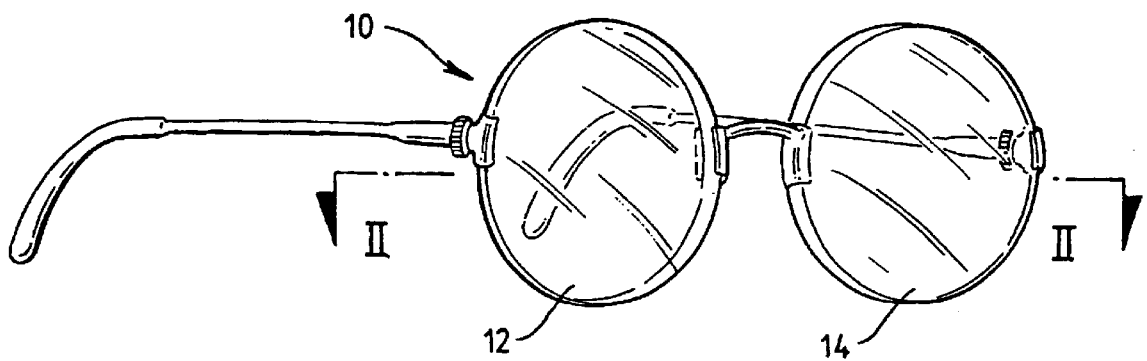
FIG. 1 is a view of a pair of spectacles in accordance a preferred embodiment of the present invention.

A pair of spectacles according to a preferred embodiment of the present invention is shown generally at 10 in FIG. 1. The spectacles 10 have right and left lenses 12 and 14 respectively. Lenses 12 and 14 are polycarbonate or acrylic 0.5 base-in prismatic lenses (of zero spherical power, that is, so-called plano lenses).

Figure 2:
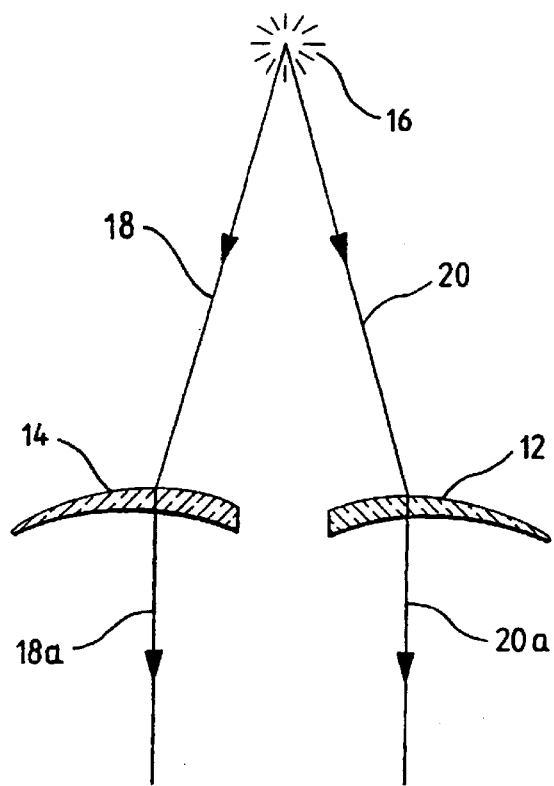
FIG. 2 is a cross-sectional view through II—II of FIG. 1.

FIG. 2 is a view of cross-section II—II in FIG. 1, together with ray tracings for a light source 16. Rays 18 and 20 diverging from light source 16 will, after impinging upon lenses 12 and 14 respectively, be refracted convergently, and emerge at 18*a* and 20*b* substantially parallel. Thus, when the spectacles 10 are worn by a user, who may be reading from a book or a computer monitor, or manipulating some apparatus at close proximity, the degree of convergence required by that proximity is reduced or in some cases substantially eliminated. Consequently, the muscular effort required to maintain this convergence is correspondingly reduced or eliminated, and the resultant muscular fatigue avoided.

Lenses 12 and 14 have, in this embodiment, a negligible magnifying effect. Thus, the spectacles 10 reduce the convergence demand on the user's eyes, without otherwise substantially altering the user's vision.

Figure 3:
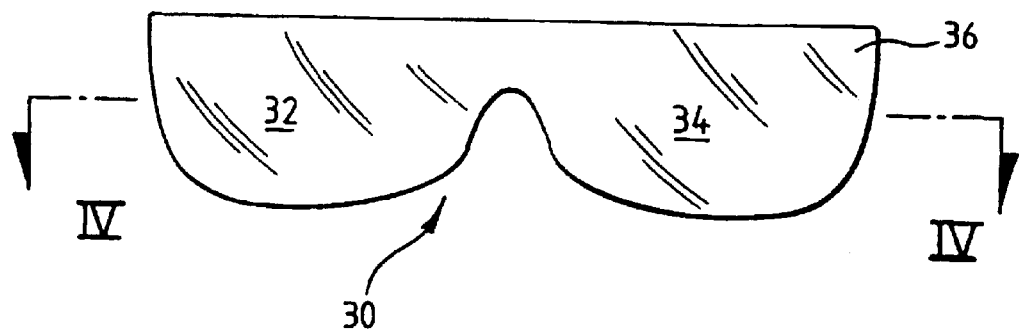
FIG. 3 is a view of a pair of spectacles according to a further embodiment of the present invention.
Figure 4:
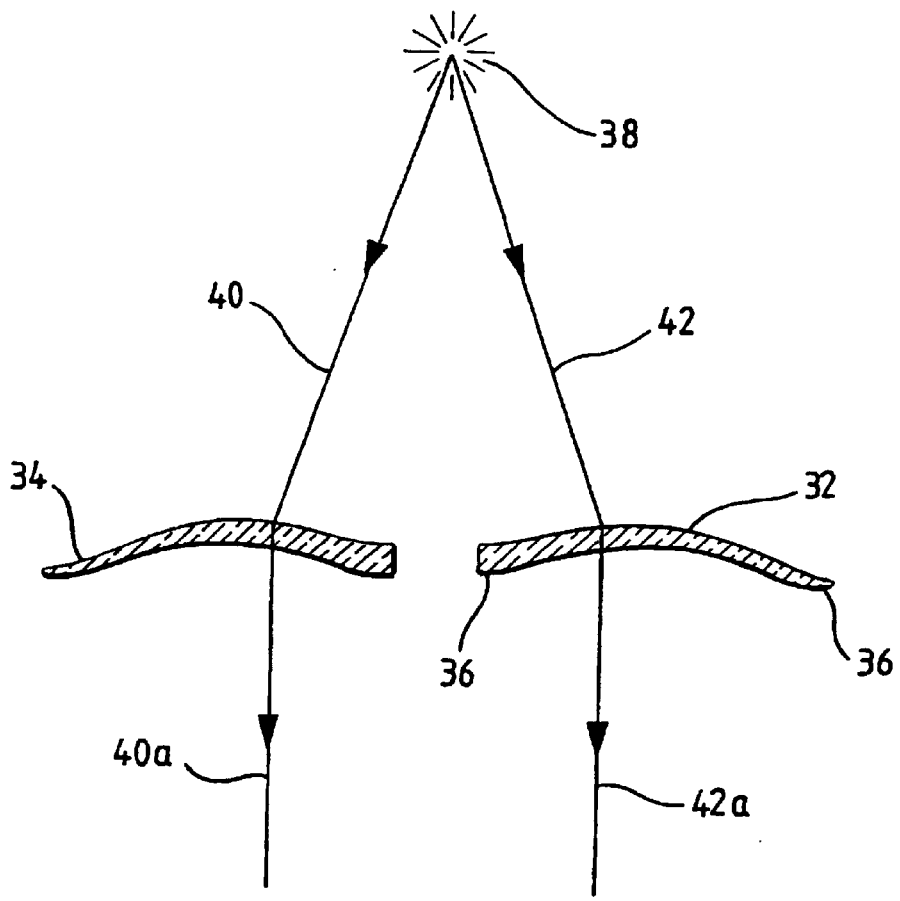
FIG. 4 is a cross-section through IV—IV in FIG. 3.

A pair of spectacles according to an alternative embodiment of the present invention is shown generally at 30 in FIG. 3. In this figure, only the lens portion of the spectacles is illustrated. Lenses 32 and 34 are formed integrally for reasons of manufacturing convenience. However, as can be seen in FIG. 4, which is a cross-section through IV—IV in FIG. 3, lenses 32 and 34 are again base-in prismatic lenses, though formed within peripheral fabric 36, integral with lenses 32 and 34, which provides and forms the equivalent of the spectacles' frame and nose bridge. As with the first embodiment, light from light source 38 (for example rays 40 and 42) are converged by means of refraction within lenses 32 and 34 to be substantially parallel at 40*a* and 42*a*.

In practice, the peripheral fabric 36 may either conform to the spherical geometry of lenses 32 and 34, or be shaped to provide a more comfortable or aesthetically pleasing appearance. In this latter case, it may be desirable to provide peripheral fabric 36 with an opaque mask or substantially opaque colour so that light impinging upon peripheral fabric 36 will not distort or blur the image presented to the user.

Modifications within the spirit and scope of the invention may readily be effected by persons skilled in the art. For example, spectacles according to the present invention may be provided with an adjustable bridge so that the distance between the two lenses is adjustable, to conform to the pupil separation of the user. Further, the lenses may be coloured to remove to some extent or completely certain colours that are thought to contribute to eye strain. Alternatively, the lenses may be somewhat modified to provide some magnification for greater ease of viewing or may superimpose a user's spectacles' prescription on the optical wedge so that other defects of vision of the user may be corrected with the reduction in convergence demand. Accordingly, it is to be understood that this invention is not limited to the particular embodiments described by way of example hereinabove.

What is claimed is:

1. An apparatus for avoiding ocular muscular fatigue comprising a binocular light converging means comprising two optical elements for converging incident light, thereby reducing ocular convergence demand when said apparatus is used by a user, wherein said optical elements are approximately 0.5 base-in prisms.

2. An apparatus as claimed in claim 1, wherein said binocular light converging means is integral.

3. An apparatus an claimed in claim 1, wherein said binocular light converging means is of polycarbonate, acrylic or some other polymeric plastic material.

4. An apparatus as claimed in claim 1, wherein said binocular light converging means is a magnifying binocular light converging means.

5. An apparatus as claimed in claim 1, wherein said binocular light converging means includes color filter.

6. An apparatus as claimed in claim 1, wherein said binocular light converging means includes color filter, and said color filter reduces the intensity of transmitted yellow light.

7. An apparatus as claimed in claim 1, further including an adjustment means whereby a separation of the two optical elements can be adjusted according to a pupil separation of the user.

8. An apparatus as claimed in claim 1, wherein said light converging means comprises two lenses.

9. An apparatus as claimed in claim 1, wherein each of said optical elements comprises a spherical optical wedge.

10. An apparatus as claimed in claim 1, wherein said optical elements are additionally prescription lenses.

11. An apparatus as claimed in claim 1, wherein said optical elements are lenses provided as a pair of spectacles.

12. A method for reducing ocular muscular fatigue due to convergence demand comprising converging light prior to said lights incidence on a user's eyes by a pair of optical elements, wherein each of said optical elements comprises an optical wedge with a base, wherein said bases of said optical elements are adjacent thereby forming base-in prisms, and wherein said prisms are approximately 0.5 base-in prisms.

13. A method an claimed in claim 12, wherein said optical elements are integral with each other.

14. A method as claimed in claim 12, wherein said optical elements are magnifying optical elements.

15. A method as claimed in claim 12, wherein said optical elements are a pair of lenses.

16. A method an claimed in claim 12, wherein said optical elements are a pair of lenses each of which comprises a spherical optical wedge.

17. A method as claimed in claim 12, wherein said optical elements are additionally prescription lenses.

18. A method as claimed in claim 12, wherein said optical elements are additionally color filters.

19. A method as claimed in claim 12, wherein said optical elements are additionally color filters that reduce the intensity of transmitted yellow light.

20. A method as claimed in claim 12, wherein the method includes adjusting a separation of the optical elements according to a pupil separation of a user.

21. A method as claimed in claim 12, including providing said optical elements as a pair of spectacles.

22. A pair of spectacles for avoiding ocular muscular fatigue comprising a pair of convergent lenses for converging incident light, thereby reducing ocular convergence demand when said spectacles are worn by a user, wherein said lenses are approximately 0.5 base-in lenses.

23. A pair of spectacles as claimed in claim 22, wherein said lenses are integral with each other.

24. A pair of spectacles as claimed in claim 22, wherein said lenses are magnifying lenses.

25. A pair of spectacles as claimed in claim 22, wherein said spectacles are additionally prescription spectacles.

26. A pair of spectacles as claimed in claim 22, wherein said spectacles include a color filter.

27. A pair of spectacles as claimed in claim 22, wherein said spectacles include color filter, and said color filter reduces the intensity of transmitted yellow light.

28. A pair of spectacles as claimed in claim 22, wherein the spectacles are provided with adjustment means whereby a separation of the lenses can be adjusted according to a pupil separation of the user.

* * * * *